Figure 1:
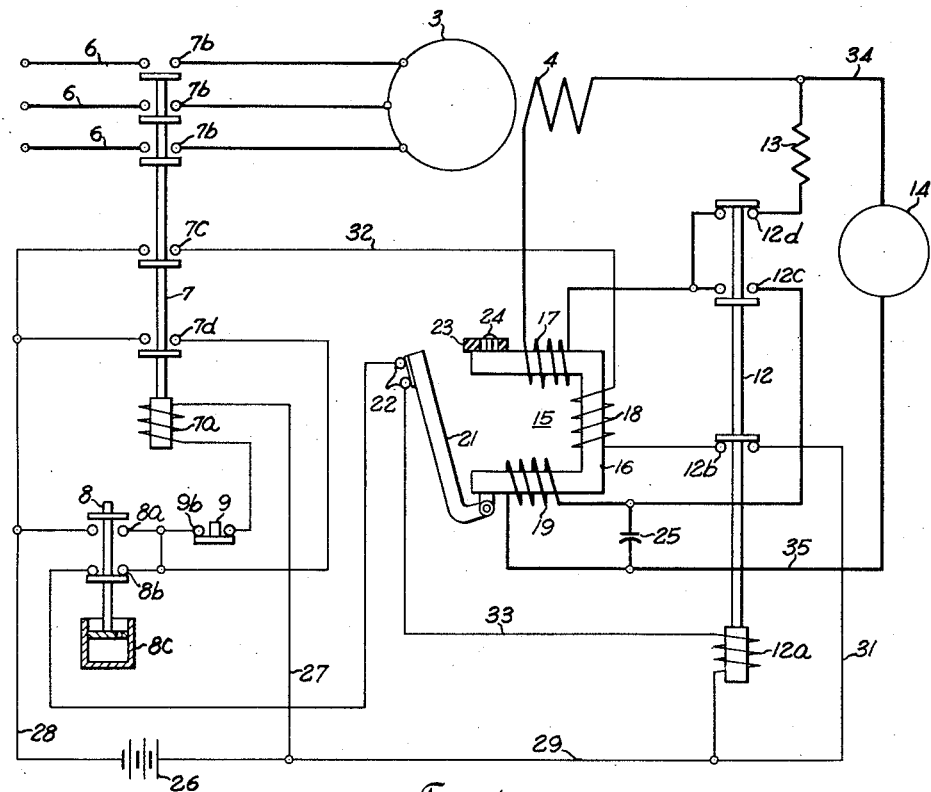

Sept. 25, 1951     T. F. BELLINGER     2,569,142
SYNCHRONOUS MOTOR CONTROL SYSTEM WITH SINGLE
RELAY FOR FIELD APPLICATION AND REMOVAL
Filed June 8, 1950

Inventor
Thaddeus F. Bellinger
by Lidie Journeaux
Attorney

Patented Sept. 25, 1951

2,569,142

UNITED STATES PATENT OFFICE 2,569,142

SYNCHRONOUS MOTOR CONTROL SYSTEM WITH SINGLE RELAY FOR FIELD APPLICATION AND REMOVAL

Thaddeus F. Bellinger, West Allis, Wis., assignor to Allis-Chalmers Manufacturing Company, Milwaukee, Wis.

Application June 8, 1950, Serial No. 166,936

4 Claims. (Cl. 318—170)

This invention relates in general to synchronous motor control systems and in particular to protective systems for such motors employing field application and field removal relays.

Prior art systems of this type use a field application relay having a generally E-shaped core provided with a current coil carrying the field current of the motor and another coil carrying a constant direct current for polarizing the relay. Such systems have the disadvantage that because of the plurality of flux paths provided by the E-shaped core, it is difficult to balance the magnetomotive forces of the two coils and prevent saturation of the core of the relay by the unidirectional current flowing during synchronous operation, thereby rendering the relay relatively insensitive to induced currents flowing in the current winding upon pull out of the motor.

This disadvantage can be overcome by utilizing a relay provided with a core having a single magnetic flux path and having a winding for preventing saturation of the relay core. One of the most suitable of such relays comprises a substantially C-shaped core having a current coil and a control coil, the two coils being wound in opposition on legs of the core and connected in series in the field circuit of the motor upon connection of the motor field winding to a source of excitation current. A suitable selectively conductive device is operatively associated with the control coil so as to cause the currents through the control coil and through the current coil to assume different instantaneous values during the flow of alternating or fluctuating currents in the field winding circuit.

It is therefore an object of this invention to provide an improved synchronous motor protective system in which saturation of the core of a field application relay is prevented independently of the magnitude of the motor field current.

It is a further object of this invention to provide an improved synchronous motor protective system in which a field application relay is insensitive to changes in magnitude of direct current flowing in the motor field winding circuit but is highly sensitive to alternating currents flowing in the field circuit.

It is an additional object of this invention to provide an improved synchronous motor protective system in which the field application relay is highly sensitive, compact, and easy to construct.

Figure 2:
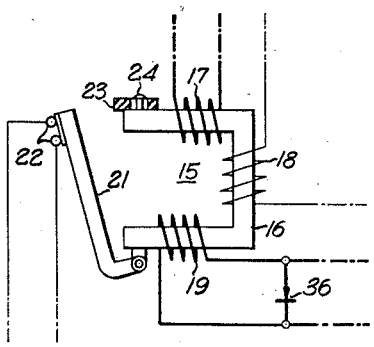

Objects and advantages other than those outlined above will be apparent from the following detailed description when read in connection with the accompanying drawing, in which:

Fig. 1 illustrates the circuits and apparatus of the preferred embodiment of this invention; and Fig. 2 partly illustrates a modification of the embodiment illustrated in Fig. 1.

In the embodiment illustrated in Fig. 1, a synchronous motor having an armature winding 3 is provided with a field winding 4. Armature winding 3 is connected to a suitable source of alternating current, represented by conductors 6, through the contacts 7b of a starting contactor 7 having an actuating coil 7a. Initiation of operation of the system is controlled by a pushbutton starting switch 8 provided with contacts 8a, 8b, and suitable known time delay means such as a dashpot 8c. A stopping pushbutton switch 9 having contacts 9b is also provided.

Suitable switching means, such as a field contactor 12 having an actuating coil 12a and contacts 12b, 12c, 12d, are provided to control the connection of field winding 4 to either a field discharge resistor 13 or a suitable source of direct current such as an exciter 14, in dependence upon the speed of the motor. Exciter 14 may be driven by motor 3, 4 or by any other suitable motive power means, not shown.

Contactor 12 is controlled by a field application relay 15 provided with a C-shaped magnetic core 16, a current coil 17, a polarizing coil 18, a control coil 19 and a pivoted armature 21.

Armature 21 is biased in any suitable manner, as by gravity, to the position shown to close a pair of contacts 22. Armature 21 is attractable in response to predetermined variations in the current flowing in field winding 4. The value of resultant flux in core 16 required to retain armature 21 attracted may be readily varied by adjustment of the position of a nonmagnetic stop 23 adjustably mounted on one leg of core 16 by a screw 24 and extending more or less beyond the end face of the core leg. Coils 18 and 19 are so wound on core 16 as to produce magnetomotive forces opposing the magnetomotive force of current coil 17. A suitable selectively conductive device, such as a capacitor 25, is connected in parallel with control coil 19 to vary the relative values of the currents through coil 19 and coil 17 under predetermined conditions in the field winding circuit.

Switch 8 is depressed to initiate operation of the system, thereby closing contacts 8a and opening contacts 8b. Dashpot 8c provides a time delay in the operation of switch 8 to maintain contacts 8a closed and contacts 8b open for a predetermined time after release of switch 8. Closure of contacts 8a energizes coil 7a of contactor 7 from a suitable source of energy such as a battery 26, through a circuit which may be traced from the right side of battery 26 through a conductor 27, coil 7a, contacts 9b, contacts 8a, and through a conductor 28 back to battery 26. Energization of coil 7a actuates contactor 7 to close its contacts 7b, 7c and 7d. Closure of contacts 7b connects armature winding 3 to conductors 6, while closure of contacts 7c completes the energizing circuit for polarizing coil 18 through a circuit which may be traced from the right side of battery 26, through conductors 29, 31, contacts 12b, coil 18, a conductor 32, contacts 7c, and through conductor 28 back to battery 26. Closure of contacts 7d seals in coil 7a across the contacts 8a.

To prevent energization of coil 12a immediately upon connection of armature winding 3 to conductors 6, contacts 8b are connected in the circuit of coil 12a. Upon release of switch 8, contacts 8b remain open for a predetermined time under the action of dashpot 8c. During this time, armature winding 3 induces currents of varying frequency and magnitude in field winding 4, which currents circulate through a field discharge circuit comprising field winding 4, discharge resistor 13, contacts 12d, and current coil 17. These currents in coil 17 produce in core 16 a magnetomotive force considerably greater than the opposing magnetomotive force of polarizing coil 18, and armature 21 is thereby attracted to open contacts 22 in the circuit of coil 12a. Contacts 8b therefore constitute time delay means for preventing energization of coil 12a upon connection of armature winding 3 to a source of alternating current.

As the motor approaches synchronous speed the frequency and magnitude of the currents induced in field winding 4 by armature winding 3 decrease. The magnetomotive force of coil 17 likewise decreases in magnitude and frequency. The combined magnetomotive forces of coil 17 and coil 18 induce in core 16 a dissymmetrical alternating resultant flux which decreases in frequency. At a predetermined percentage of synchronous speed of the motor, the resultant flux in core 16 remains close to the value zero for a sufficient length of time to release armature 21, and armature 21 drops out to close contacts 22. Closure of contacts 22 completes the energizing circuit for coil 12a through a circuit which may be traced from the right side of battery 26, through conductor 29, coil 12a, a conductor 33, contacts 22, contacts 8b, contacts 7d and conductor 28 back to battery 26. Energization of coil 12a actuates contactor 12 to open its contacts 12b, 12d and close its contacts 12c. Opening of contacts 12d disconnects polarizing coil 18 from battery 26, while opening of contacts 12d disconnects discharge resistor 13 from field winding 4 and coil 17.

Closure of contacts 12c connects field winding 4 in circuit with exciter 14 through a circuit which may be traced from one side of exciter 14, through a conductor 34, field winding 4, coil 17, contacts 12c, coil 19 in parallel with capacitor 25, and through a conductor 35 back to exciter 14. Exciter 14 thereupon supplies unidirectional excitation current to field winding 4 through the circuit described above to cause synchronous operation of the motor.

During synchronous operation, the unidirectional field excitation current traverses series connected coils 17 and 19 to produce equal and opposing magnetomotive forces in the two coils. The resultant flux in core 16 is therefore substantially zero and armature 21 remains unattracted. Capacitor 25 acts like an open switch with respect to the normal unidirectional excitation current and does divert any current from coil 19. A change in the value of excitation current supplied by exciter 14 will not affect relay 15 nor necessitate any adjustments to retain armature 21 unattracted, since the increase in current will be automatically compensated for by series connected coils 17 and 19. Therefore, no adjustments are necessary to relay 15 regardless of the magnitude of the unidirectional excitation current flowing in winding 4.

If the motor pulls out of synchronism, alternating current of considerable magnitude is induced in field winding 4 by armature winding 3. This alternating current component is superposed on the normal unidirectional excitation current component in field winding 4, to form the resultant current through coils 17 and 19. The major portion of this alternating current component will be diverted from coil 19 by capacitor 25, thereby reducing the current and magnetomotive force of coil 19 during one half of the slip cycle, and increasing them during the other half of the slip cycle.

As polarizing coil 18 then is deenergized, either a reduction or an increase in the magnetomotive force of coil 19 with respect to the magnetomotive force of coil 17 reduces the resultant flux in core 16 and causes armature 21 to be attracted. Attraction of armature 21 opens contacts 22 to break the energizing circuit of coil 12a and thereby causes contactor 12 to drop out. Contactor 12 opens its contacts 12c to disconnect field winding 4 from exciter 14 and closes its contacts 12b, 12d to reconnect polarizing coil 18 to battery 26 and to reconnect discharge resistor 13 in circuit with field winding 4 and coil 17. The system is thereby returned to the proper condition for resynchronizing the motor.

In the modification illustrated in Fig. 2, capacitor 25 is replaced by a suitable rectifying device 36 connected across coil 19. Rectifier 36 has a polarity such that it does not divert any unidirectional excitation current from coil 19. If the motor pulls out of synchronism, rectifier 36 still conducts no current when the alternating current which is induced in winding 4 and which is flowing in the field circuit is of the same polarity as the excitation current. When the resultant of the two currents has the reverse polarity, rectifier 36 conducts current. This selective conducting action of rectifier 36 reduces the current flowing in coil 19 with respect to the current in coil 17 and thereby causes the production of a resultant flux in core 16 in a manner similar to that described in connection with Fig. 1. This resultant flux causes armature 21 to be attracted to break the circuit for coil 12a and causes disconnection of field winding 4 from exciter 14 as described above.

Although but two embodiments of the present invention have been illustrated and described, it will be apparent to those skilled in the art that various modifications and changes may be made therein without departing from the spirit of the invention or the scope of the appended claims.

It is claimed and desired to secure by Letters Patent:

1. In a system comprising a synchronous motor having an armature winding and a field winding, a source of direct current, a source of alternating current, and means for connecting said armature winding to said source of alternating current, the combination of switching means for connecting said field winding to said direct current source, a relay for controlling operation of said switching means, said relay comprising a current coil, a biasing coil, a control coil and a core having a single magnetic path, means for energizing said biasing coil with a constant direct current prior to connection of said field winding to said direct current source, means for energizing said current coil in dependence upon the current flowing in said field winding, whereby said relay operates in response to predetermined variations in the current in said field winding to cause said switching means to connect said field winding in circuit with said direct current source through said control coil in series with said current coil and to cause said biasing coil to become deenergized, said coils being so connected that the direct current in said current coil and said control coil produces opposing magnetomotive forces in said core, and a capacitor connected in parallel with said control coil for diverting from said control coil currents induced in said field winding by said armature winding, whereby said relay causes said switching means to disconnect said field winding from said direct current source upon pull-out of said motor.

2. In a system comprising a synchronous motor having an armature winding and a field winding, a source of alternating current, a source of direct current, and means for connecting said armature winding to said source of alternating current, the combination of switching means for connecting said field winding to said source of direct current, a relay for controlling said switching means, said relay comprising a current coil, a control coil, a biasing coil and a core having a single magnetic path, means for supplying said biasing coil with a constant direct current prior to connection of said field winding to said direct current source, means for energizing said current coil in dependence upon the current flowing in said field winding, whereby said relay operates in response to predetermined variations in the current in said field winding to cause said switching means to connect said field winding in circuit with said direct current source through said control coil in series with said current coil and to cause said biasing winding to become deenergized, said coils being so connected that the direct current in said current coil and said control coil produces opposing magnetomotive forces in said core, and a rectifier connected in parallel with said control coil for preventing reversal of the flow of current in said control coil, whereby said relay causes said switching means to disconnect said field winding from said direct current source upon pull-out of said motor.

3. In a system comprising a synchronous motor having an armature winding and a field winding, a source of alternating current, a source of direct current, and means for connecting said armature winding to said source of alternating current, the combination of switching means for connecting said field winding to said source of direct current, a relay for controlling said switching means, said relay comprising a current coil, a control coil, a biasing coil and a core having a single magnetic path, means for supplying said biasing coil with a constant direct current prior to connection of said field winding to said direct current source, means for energizing said current coil in dependence upon the current flowing in said field winding, whereby said relay operates in response to predetermined variations in the current in said field winding to cause said switching means to connect said field winding in circuit with said direct current source through said control coil in series with said current coil and to cause said biasing winding to become deenergized, said coils being so connected that the direct current in said current coil and said control coil produces opposing magnetomotive forces in said core, and a selectively conducting device connected in parallel with said control coil for diverting from said control coil current induced in said field winding by said armature winding whereby said relay causes said switching means to disconnect said field winding from said direct current source upon pull-out of said motor.

4. In a system comprising a synchronous motor having an armature winding and a field winding, a source of direct current, a source of alternating current, and means for connecting said armature winding to said source of alternating current, the combination of switching means for connecting said field winding to said direct current source, a relay for controlling said switching means, said relay comprising a current coil, a biasing coil, a control coil and a core having a single magnetic path, means for energizing said biasing coil with a constant direct current prior to connection of said field winding to said direct current source, means for energizing said current coil in dependence upon the current flowing in said field winding, whereby said relay operates in response to predetermined variations in the current of said field winding to cause said switching means to connect said field winding in circuit with said direct current source through said control coil in series with said current coil and to cause said bias coil to become deenergized, said coils being so connected that the direct current in said current coil and in said control coil produces opposing magnetomotive forces in said core, and means operatively associated with said control coil for varying the current in said control coil with respect to the current in said current coil upon appearance of induced currents of predetermined magnitude in said field winding circuit, whereby said relay causes said switching means to disconnect said field winding from said direct current source upon pull-out of said motor.

THADDEUS F. BELLINGER.

No references cited.